United States Patent [19]

France et al.

[11] 3,995,262

[45] Nov. 30, 1976

[54] ELECTRIC LAMP FAILURE INDICATOR CIRCUIT

[75] Inventors: George France, Morpeth; Jack Watts, Whitley Bay, both of England

[73] Assignee: Welwyn Electric Limited, England

[22] Filed: June 25, 1975

[21] Appl. No.: 590,339

[52] U.S. Cl............................... 340/251; 315/129; 340/52 R
[51] Int. Cl.[2]......................................... G08B 21/00
[58] Field of Search............... 340/251, 81 R, 52 R, 340/256; 307/10 LS; 315/82, 129; 180/103 R

[56] References Cited
UNITED STATES PATENTS

| | | | |
|---|---|---|---|
| 3,183,498 | 5/1965 | Midis et al. | 340/213 R |
| 3,417,310 | 12/1968 | Hill | 315/129 |
| 3,624,630 | 11/1971 | Schroeder | 340/251 |
| 3,898,513 | 8/1975 | Kopernik et al. | 340/251 |

*Primary Examiner*—Glen R. Swann, III
*Attorney, Agent, or Firm*—McDougall, Hersh & Scott

[57] ABSTRACT

A core of magnetic material in the shape of a closed loop has three windings thereon. The first winding forms a circuit with a lamp to be monitored. As long as the lamp's filament is intact, whether or not the lamp is energized, this circuit can conduct current. The second winding is connected to a pulse generator to induce variations in the magnetic flux in the core. The third winding detects these variations in flux and a detection circuit connected to the third winding produces an indication if the variations are greater than a predetermined threshold. If the lamp is energized, the current in the first winding causes the core to be saturated with magnetic flux and thus the induced flux variations are below the detection threshold. If the lamp is unenergized, but intact, the current pulses in the second winding induce counter-pulses in the first winding which counteract the effect of the pulses in the second winding and thus the induced flux changes are below the detection threshold. If the lamp filament is broken, the pulses in the second winding will produce a sufficient change in flux in the core to be detected. Thus a defective lamp is detected whether or not it is energized. A second embodiment monitors two lamps with one core.

6 Claims, 3 Drawing Figures

ELECTRIC LAMP FAILURE INDICATOR CIRCUIT

BACKGROUND

The present invention relates to electric lamp failure indicators and more particularly to a warning device for providing an indication that failure has occurred, e.g. in a lamp which fulfils an important function. The invention is especially, although not exclusively, applicable to front and rear lamps of motor vehicles to provide an indication to the driver, inside the vehicle, that such lamps are functioning correctly.

Although in the following description reference is made specifically to motor vehicles, the invention is also applicable to apparatus and instruments where one or more lamps are relied upon to provide important information and where it is desired to avoid unrecognized failure of such lamps.

Lamp failure indicators for use with front and rear lamps on motor vehicles have been proposed previously. In one system, a low value electrical resistor is connected in series with a lamp being monitored; the voltage drop across the resistor which results when the lamp is switched on and working is combined with corresponding signals from the other lamp circuits to hold off a warning lamp. If any one lamp fails, the warning lamp lights. The disadvantage of this system is that the presence of the resistor reduces the output available from each lamp and the need for an expensive circuit arrangement to detect the small signals from said resistor.

In another known system, a current balancing relay is employed. The current taken by each lamp being monitored flows through a solenoid, the solenoids being arranged so that the magnetic field produced by the current of one lamp of a pair opposes the field produced by the other lamp of the pair and thus a null field exists when all lamps are operating. If a lamp fails, the magnetic field is no longer balanced and a magnetic reed switch is caused to be closed to switch on a warning lamp. For this approach to be successful, there must be a reasonable close balance in the power taken by each lamp in a pair and this causes difficulties due to the wide tolerance in lamp ratings.

It is a purpose of the present invention to overcome or minimize one or more of the disadvantages of the above lamp failure indicators.

Both known systems described above can only indicate whether a lamp is operating correctly or has failed when the lamp is switched on, but it is desirable to have an indication that the lamp has failed even when it is switched off, e.g. during the hours of daylight, in the case of a motor vehicle, when it is most convenient to replace the lamp.

SUMMARY

The present invention provides a device for indicating an electric lamp failure, comprising (i) a core of magnetic material in the form of a closed loop, (ii) a first wire winding on the core, adapted to be connected in circuit with the lamp in such a way that electric current flowing through the lamp also flows through said winding, the number of turns on the first wire winding being sufficient to result in magnetic saturation of the core, (iii) a second wire winding on the core, adapted to be connected to an electrical circuit, which circuit is arranged to generate electrical current pulses in the second winding, thereby inducing variations in magnetic flux density in the core, and (iv) a third wire winding on the core, adapted to be connected to an electrical circuit capable of detecting the amplitude of a voltage or current induced in the third winding as a result of a change in flux density in the core due to a current pulse in the second winding, thereby providing an indication of whether or not the lamp is operating. The three wire windings may be composed of any suitable number of turns. Suitably the magnetic core is a ferrite and is of toroidal form. The magnetic material may exhibit linear characteristics or square loop characteristics.

BRIEF DESCRIPTION OF THE DRAWINGS

The invention is described hereinafter with reference to the accompanying drawings in which.

DESCRIPTION OF THE PREFERRED EMBODIMENTS

In one embodiment, the second winding is adapted to be connected to a circuit which produces current pulses through said winding in such a direction as to increase the field strength and hence the flux density in the core, and the third winding is adapted to be connected to a pulse amplitude discriminator adapted to operate an indicating or alarm device when the amplitude of the change in flux density in the core due to a current pulse in the second winding exceeds a certain preset level. When the lamp current is flowing in the first winding and each of the second and third windings is connected with its associated circuit, the magnetic core is biased to operate in the saturated region and under these conditions, the electrical output from the third winding, due to the pulse current in the second winding, is small. However, if the lamp, or associated circuit, should fail, so that there is no longer any current flowing in the first winding, then the condition of magnetic saturation of the core, which was due to the lamp current flowing in the first winding, no longer holds. The core is then magnetically unsaturated and the electrical output from the third winding becomes of much greater amplitude. This increased amplitude is detected by the pulse amplitude discriminator which operates an indicator or alarm such as a warning lamp, buzzer etc.

Figure 1:
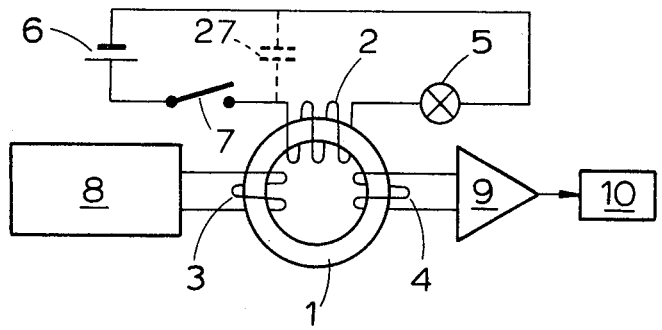
FIG. 1 shows, in schematic form, one embodiment of the device of the invention.
Figure 2:
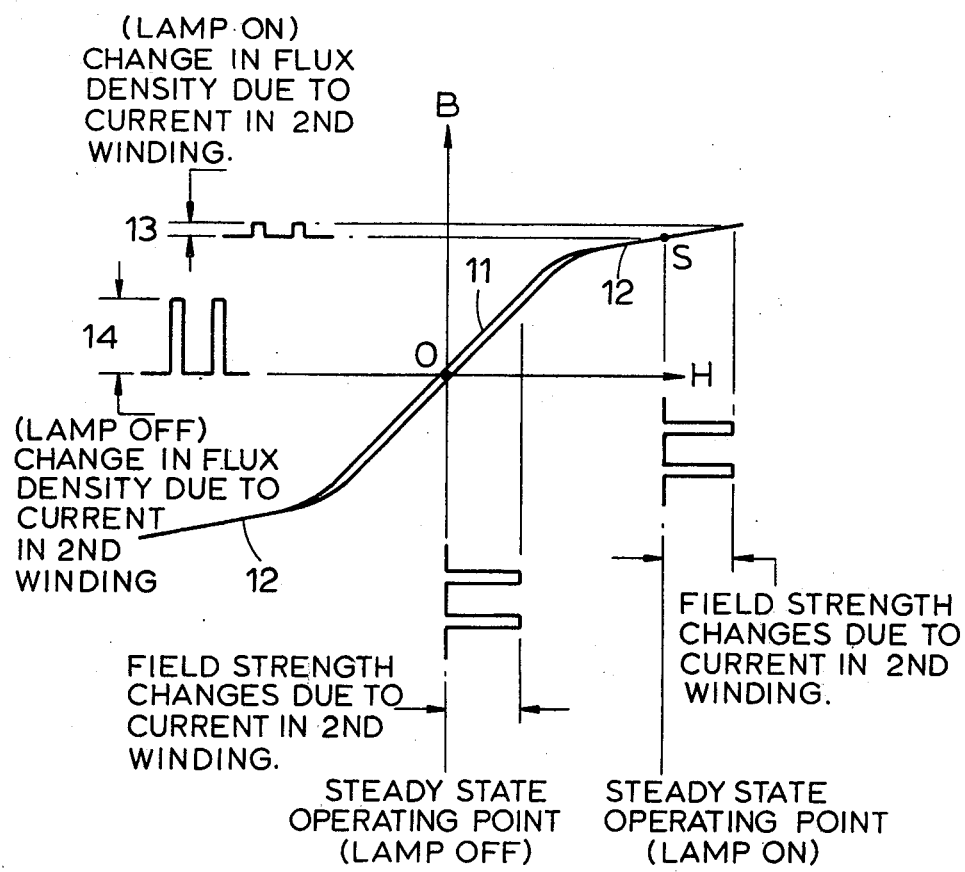
FIG. 2 shows a typical magnetic flux density — magnetic field strength loop for a core of linear magnetic material applied to the device of the invention.

A second embodiment enables two lamps to be monitored using a pair of first windings on a single magnetic core. Each of the windings is adapted to be connected in circuit with a lamp to be monitored and arranged so that, when the lamp is working, the current passing through its associated winding is such as to result in magnetic saturation of the core, the pair of first windings being arranged so that, when both lamps are operating, the magnetic field produced by the current in one winding is opposed by that produced by the current in the other winding. The result is zero magnetic field due to the pair of first windings, when both lamps are operating. The current pulses passing through the second winding are arranged to be alternately negative pulses and positive pulses. When both lamps are operating, the amplitude of the output from the third wind- The arrangements shown in FIGS. 1 and 3 can be used to provide an indication that a lamp has failed even when the lamp is not energized, i.e., when switches 7 and 23 are in the open position. To achieve this with the circuit of FIG. 1, a capacitor 27 must be connected in parallel with winding 2 and lamp 5. When switch 7 is open, the resistance of the unenergized lamp 5 is low; the core 1 with its windings thereon functions as a transformer with the result that when the current pulses from generator 8 pass through winding 3, they result in output voltage pulses from the winding 2 and these produce a current in the winding 2 and through the lamp 5, the capacitor 27 allowing this current to pass. This current is of sufficient amplitude to reduce the flux density in the core 1 (due to the field produced by the current in winding 3) to a low value and hence the output from the winding 4 is of low amplitude. If the lamp 5 fails, the current through the winding 2 ceases and since the field produced by the current pulses in winding 3 is now no longer opposed by the "transformer action" current in the lamp circuit, the flux change in the core 1 becomes large, resulting in an output of greater amplitude from the winding 4. This change in amplitude can be detected by the circuit 9 and used to operate alarm 10.

Figure 3:
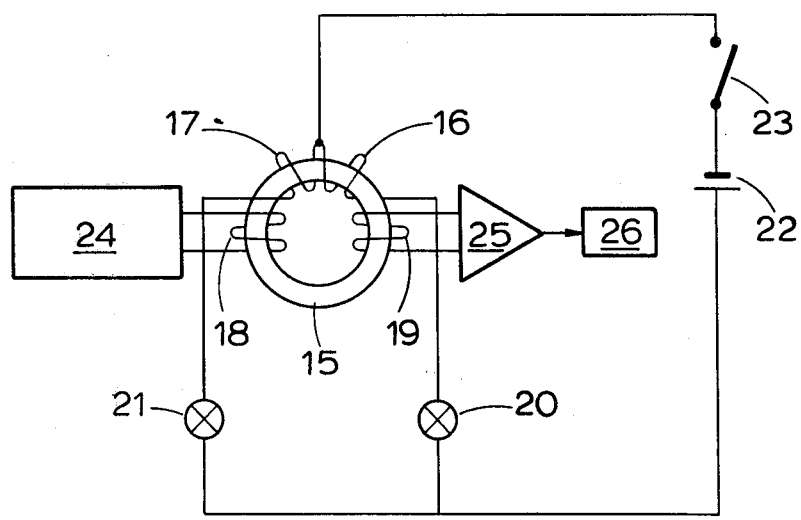
FIG. 3 shows another embodiment of the device of the invention.

In the case of the arrangement of FIG. 3, there is no need to employ a capacitor in the circuit when used to detect failure of an unenergized lamp. In FIG. 3, the windings 16 and 17 and lamps 20 and 21 form a closed circuit even when switch 23 is open. When current pulses from generator 24 pass through winding 18, they result in output voltage pulses from the windings 16 and 17 which add and produce a current in the windings 16 and 17 and through lamps 20 and 21. In the same way as with the arrangement of FIG. 1, this current reduces the flux density of the core 15 to a low value and hence the output from the winding 19 is of low amplitude. If either of lamps 20, 21 fails, the current through the windings 16, 17 ceases and the flux change in the core 15 becomes large, resulting in an output of greater amplitude from the winding 19. This change in amplitude can be detected by the circuit 25 and used to operate alarm 26.

Although the present invention is described herein with particular reference to specific details, it is not intended that such details shall be regarded as limitations upon the scope of the invention except insofar as included in the accompanying claims.

We claim:
1. A device for indicating an electric lamp failure, comprising
   i. a core of magnetic material in the form of a closed loop,
   ii. a first winding on the core forming an electrical circuit with the lamp allowing electric current to flow through said lamp while said lamp is operable, said current being either induced by said core when said lamp is unenergized or supplied by a source of direct electric current for energizing said lamp when said lamp is energized, the number of turns on the first winding being such as to result in magnetic saturation of the core when the lamp is energized,
   iii. a second winding on the core in circuit with an electrical circuit for generating electric current pulses in the second winding whereby variations in magnetic flux density are induced in the core, and
   iv. a third winding on the core forming an electrical circuit capable of detecting the amplitude of a voltage or current induced in the third winding as a result of a change in amplitude of the said variations in flux density in the core occasioned by failure of the lamp.

2. A device according to claim 1 in which the second winding forms part of a circuit which is able to produce current pulses through said winding in a direction such as to increase the field strength and hence the flux density in the core, and the third winding forms part of a circuit including a pulse amplitude discriminator capable of operating an indicating or alarm device when the ampliutde of the change in flux density in the core due to the current pulse in the second winding exceeds a certain preset level.

3. A device according to claim 2 in which there is provided a capacitor connected in parallel with the first winding and lamp whereby the electric circuit is formed when said sources does not energize the lamp.

4. A device according to claim 2 in which there is provided a pair of first windings on a single magnetic core, each forming a circuit with a respective lamp to be monitored and arranged so that, when a lamp is operable, the current passing through its associated winding is such as to result in magnetic saturation of the core, the pair of first windings being arranged so that, when both said lamps are operable, the magnetic field produced by the current in one of said pair of first windings is opposed by that produced by the current in the other of said pair of first windings, and the current pulses passing through said second winding being arranged to be alternatively negative pulses and positive pulses.

5. A device according to claim 1 in which there is provided a capacitor connected in parallel with the first winding and lamp whereby the electric circuit is formed when said source does not energize the lamp.

6. A device according to claim 1 in which there is provided a pair of first windings on a single magnetic core, each forming a circuit with a respective lamp to be monitored and arranged so that, when a lamp is operable, the current passing through its associated winding is such as to result in magnetic saturation of the core, the pair of first windings being arranged so that, when both said lamps are operable, the magnetic field produced by the current in one of said pair of first windings is opposed by that produced by the current in the other of said pair of first windings, and the current pulses passing through said second winding being arranged to be alternatively negative pulses and positive pulses.

* * * * *